United States Patent
Koch et al.

(10) Patent No.: US 8,302,848 B2
(45) Date of Patent: Nov. 6, 2012

(54) SYSTEM AND METHOD FOR CONFIGURING A SCANNER

(75) Inventors: David S. Koch, Islip, NY (US); Yusuf Dalal, Hicksville, NY (US)

(73) Assignee: Symbol Technologies, Inc., Holtsville, NY (US)

(*) Notice: Subject to any disclaimer, the term of this patent is extended or adjusted under 35 U.S.C. 154(b) by 938 days.

(21) Appl. No.: 12/126,750

(22) Filed: May 23, 2008

(65) Prior Publication Data

US 2009/0323133 A1 Dec. 31, 2009

(51) Int. Cl.
*G06F 17/00* (2006.01)
*G06K 7/10* (2006.01)

(52) U.S. Cl. ............... 235/375; 235/462.01; 235/462.15

(58) Field of Classification Search ............ 235/462.15, 235/375; 705/41, 42
See application file for complete search history.

(56) References Cited

U.S. PATENT DOCUMENTS

| | | | | |
|---|---|---|---|---|
| 4,475,153 A * | 10/1984 | Kihara et al. | ............ | 700/16 |
| 4,825,058 A * | 4/1989 | Poland | ............ | 235/462.01 |
| 5,602,377 A * | 2/1997 | Beller et al. | ............ | 235/462.15 |
| 5,635,698 A * | 6/1997 | Terada | ............ | 235/462.01 |
| 5,837,986 A * | 11/1998 | Barile et al. | ............ | 235/462.01 |
| 6,036,091 A * | 3/2000 | Spitz | ............ | 235/462.25 |
| 7,686,216 B2 * | 3/2010 | Walczyk et al. | ............ | 235/383 |
| 2004/0222300 A1 | 11/2004 | Strickland | | |
| 2005/0274804 A1 | 12/2005 | Matsumoto | | |
| 2006/0049261 A1 * | 3/2006 | Stadtler | ............ | 235/462.15 |
| 2007/0139683 A1 | 6/2007 | Wegeng et al. | | |
| 2007/0228137 A1 | 10/2007 | Bhella et al. | | |
| 2007/0252007 A1 * | 11/2007 | Watanabe | ............ | 235/462.15 |

OTHER PUBLICATIONS

International Search Report and the Written Opinion of the International Searching Authority for International Application PCT/US2009/043914 mailed Jul. 14, 2009.
European Search Report dated Jul. 18, 2011 in related European patent application 09751214.9.
International Preliminary Report on Patentability dated Dec. 2, 2010 in related case PCT/US2009/0043914.
International Preliminary Report on Patentability mailed on Dec. 2, 2010 in counterpart International Application No. PCT/US2009/043914.
Supplementary European Search Report mailed on Jul. 18, 2011 in counterpart European Patent Application No. 09751214.

* cited by examiner

*Primary Examiner* — Jamara Franklin

(57) ABSTRACT

A system and method configures a scanner. The method comprises generating an object using an output arrangement of a host device. The object includes configuration data which corresponds to a peripheral device. The method comprises scanning the object using a scanner of the peripheral device to obtain the configuration data. The method comprises configuring the peripheral device as a function of the configuration data. The method comprises coupling the peripheral device to the host device.

13 Claims, 3 Drawing Sheets

SYSTEM AND METHOD FOR CONFIGURING A SCANNER

FIELD OF THE INVENTION

The present invention relates generally to a system and method for configuring a scanner. Specifically, a host device to which the scanner couples includes a display that shows data that is scanned to configure the scanner.

BACKGROUND

When a scanner is coupled to a host device, the scanner must be properly configured to communicate with the host device. The configuration may be performed at a manufacturing stage or a post manufacturing stage that entails scanning at least one barcode or loading new firmware onto the scanner to ensure a proper default configuration prior to coupling the scanner to the host device. If the scanner is improperly configured or configuration barcodes and/or custom firmware is unavailable, the proper configuration of the scanner is not possible, thereby causing the scanner to be unusable.

The coupling of the scanner to the host device may be a hard-wiring or a wireless connection. When the scanner is coupled to a particular host device by scanning configuration barcodes, the configuration barcodes are often disposed on a surface of the host device. This may ensure that the proper configuration barcodes are used to couple the scanner to the host device. Over time, the configuration barcodes may become worn, sustain damage, be unreadable, etc. Consequently, the configuration barcode disposed on the host device must be replaced. Because the configuration barcode is for the particular host device, the configuration barcode is unique to match with a specific terminal (e.g., host device). The configuration barcodes may also be located in remote areas such as a manual, a packaging box, etc. Over time, these barcodes may also become unusable or lost.

SUMMARY OF THE INVENTION

The present invention relates to a system and method for configuring a scanner. The method comprises generating an object using an output arrangement of a host device. The object includes configuration data which corresponds to a peripheral device. The method comprises scanning the object using a scanner of the peripheral device to obtain the configuration data. The method comprises configuring the peripheral device as a function of the configuration data. The method comprise coupling the peripheral device to the host device.

DETAILED DESCRIPTION

Figure 1:
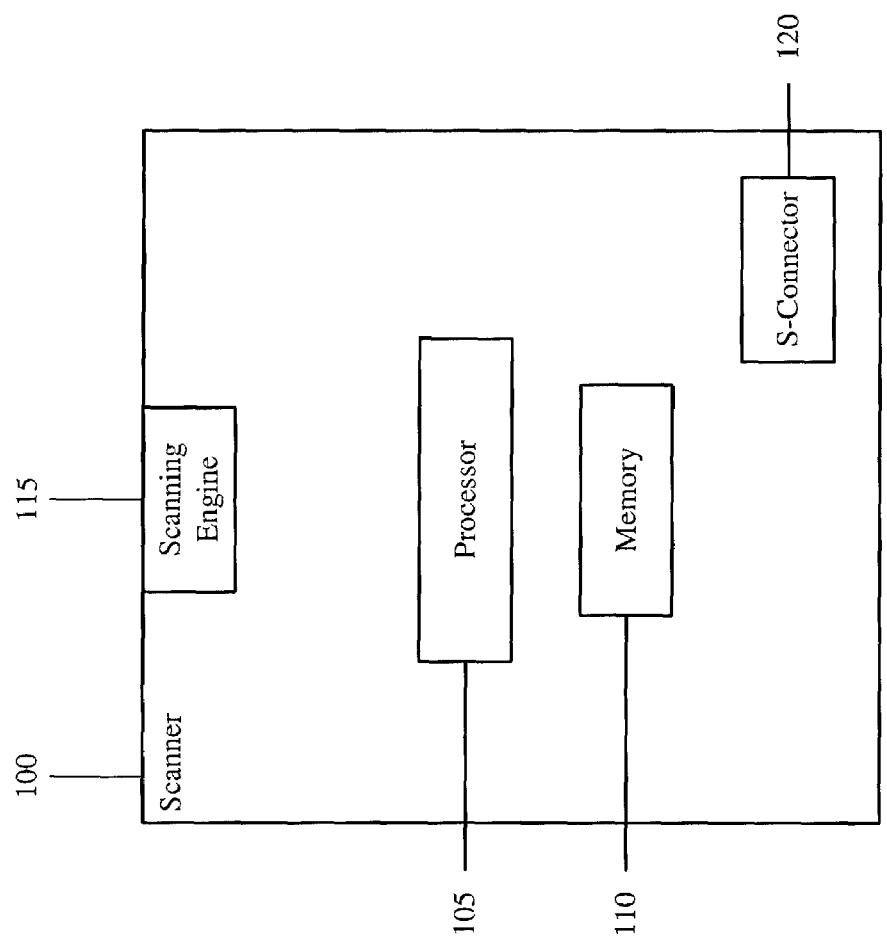
FIG. 1 shows a scanner according to an exemplary embodiment of the present invention.

The exemplary embodiments of the present invention may be further understood with reference to the following description and the appended drawings, wherein like elements are referred to with the same reference numerals. The exemplary embodiments of the present invention describe a system and method for configuring a scanner (e.g., an image or laser based scanner). According to the exemplary embodiments of the present invention, the scanner may couple to a host device. The scanner is configured by scanning data from a display of the host device. The scanner, the host device, the data, the display, and a related method will be discussed in further detail below.

It should be noted that the use of the scanner is only exemplary. According to the exemplary embodiments of the present invention, the scanner may represent any peripheral device that couples to a host device that is capable of performing a scan. Thus, the peripheral device may be any computing device such as a mobile computer, a personal digital assistant (PDA), a laptop, an RFID reader, an image capturing device, a pager, etc.

FIG. 1 shows a scanner 100 according to an exemplary embodiment of the present invention. The scanner 100 may be a peripheral device that couples to a host device. The host device will be discussed in further detail below with reference to FIG. 2. The scanner 100 may be communicatively coupled to the host device for an exchange of data. In particular, the scanner 100 may be properly coupled to the host device upon receiving configuration data. Thereafter, the scanner 100 may receive data from scanning an object such as a one-dimensional barcode and transmit decoded data relating to the object to the host device. The scanner 100 may include a processor 105, a memory 110, a scanning engine 115, and a scanner connector (hereinafter "s-connector") 120.

The processor 105 may be configured to be responsible for the operations and functionalities of the scanner 100. Specifically, the processor 105 may receive scanned data and decode the data. The processor 105 may further determine whether the decoded data is to be transmitted to a further device such as the host device or to be used for the scanner such as with configuration data. The memory 110 may be a storage unit for the scanner 100. For example, the scanner 100 may store the scanned data and/or the decoded data in the memory. If the scanner 100 is portable, the scanner 100 may further include a battery to provide a power supply. The battery may be rechargeable.

The scanning engine 115 may perform a scan on an object. For example, the object may be a one-dimensional barcode. According to one exemplary embodiment of the present invention, the scanning engine 115 may be a laser based engine so that a laser is emitted from the scanning engine with a line of sight to the object. A reflection of the laser may be received by the scanning engine 115 to determine an intensity corresponding to encoded data of the object. In another example, the object may be a two-dimensional barcode. According to another exemplary embodiment of the present invention, the scanning engine 115 may be an imager based engine so that an image of the object is captured with a line of sight to the object. Through image processing techniques, the encoded data of the object may be determined. In either example, the encoded data may be interpreted using known techniques to determine the decoded data. It should be noted that other objects may be scanned and a corresponding type of scanning engine 115 may be used. For example, the object may be a color barcode, an optical character recognition (OCR) string, an image, etc.

According to the exemplary embodiments of the present invention, the scan data (i.e., encoded data) of the object received by the scanning engine 215 may be decoded to calibrate the scanner 100 in order to properly couple the scanner 100 to a host device. Those skilled in the art will understand that the scanner 100 is required to be configured in a predetermined manner to properly couple to the host device. Thus, for example, the scanner 100 is enabled to exchange data with the host device. The configuration may provide the scanner 100 with a protocol in which to transmit the scanned data to the host device. The configuration may also uniquely couple the scanner 100 to the host device. Because the scanner 100 may be coupled to any host device, when coupling to a particular host device, the scanner 100 is required to be properly configured prior to any use of the scanner with the host device. Accordingly, the object which is scanned by the scanner 100 may be unique to that host device. For example, a one-dimensional barcode may include encoding of a model type number and a specific model unit number in addition to other data such as the protocol in which the host device operates for transmissions/receptions of data.

The s-connector 120 may provide the coupling of the scanner 100 to the host device. The s-connector 120 may include a variety of different exemplary embodiments. In a first example, the scanner 100 may be coupled to the host device in a hard-wired configuration. Thus, the s-connector 120 may be a port that receives a jack of a cable (a further jack of the cable being received in a port of the host device); the s-connector 120 may be a via in which an integrated cable extends from a printed circuit board (PCB) of the scanner 100 so that a jack disposed on an opposite end of the integrated cable is received by the host device; etc. In a second example, the scanner 100 may be coupled to the host device in a wireless configuration. Thus, the s-connector 120 may be a transceiver. In a specific exemplary embodiment of the second example, the scanner 100 may be a Bluetooth peripheral. Thus, the s-connector 120 may be a short range transceiver that wirelessly communicates with the host device.

Figure 2:
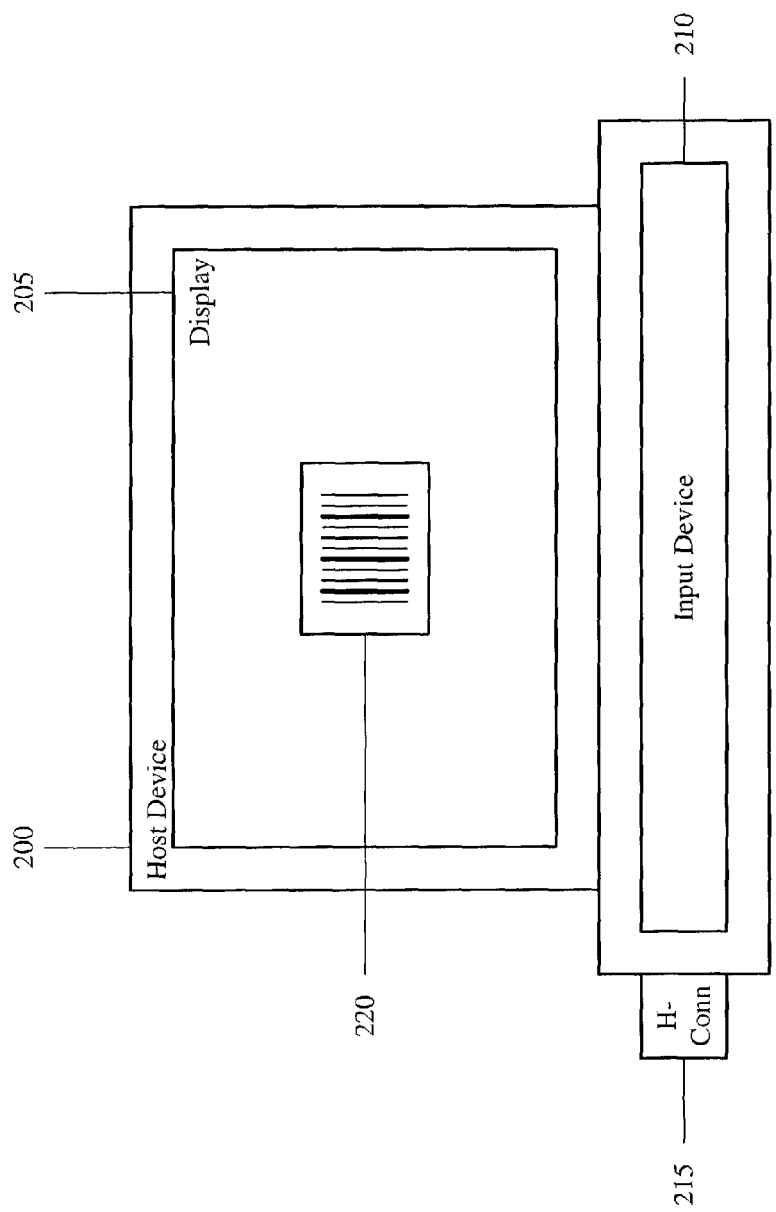
FIG. 2 shows a host device in which the scanner of FIG. 1 couples thereto according to an exemplary embodiment of the present invention.

FIG. 2 shows a host device 200 in which the scanner 100 of FIG. 1 couples thereto according to an exemplary embodiment of the present invention. As discussed above, the scanner 100 may couple to the host device 200 for an exchange of data. In particular, the host device 200 may receive the decoded data in which the scanner 100 may have decoded upon scanning an object (e.g., one-dimensional barcode, two-dimensional barcode, etc.). The host device 200 may include a display 205, an input device 210, and a host device connector (hereinafter "h-connector") 215.

The host device 200 may be a stationary computing device (e.g., a register) or a portable device. For example, as a register, the host device 200 may be a component of a point of service/sale (POS) system. Accordingly, the scanner 100 may be a peripheral to scan an object (e.g., barcode) disposed on an item for service/sale. The display 205 may be, for example, a monitor (e.g., CRT, LCD, etc.) in which various information may be shown to a user. The display 205 may be configured so that the scanner 100 may scan an object shown thereon. The configuration of the display 205 for this purpose will be described in further detail below. The input device 210 may be, for example, a keyboard (e.g., numeric, alphanumeric, QWERTY, etc.) in which various data may be entered. The host device 200 may include further devices such as peripherals connected thereto such as a mouse, a printer, a magnetic/smart card interface, an RFID reader, a magnetic strip reader, etc.

The h-connector 215 may be a corresponding coupling device for the s-connector 120. For example, if the scanner 100 is hard-wired to the host device 200, the h-connector 215 may be a port receiving a jack of a cable in which an opposite end is connected to the scanner 100. If the scanner 100 is in wireless communication with the host device 200, the h-connector 215 may be a transceiver in which data is transmitted and/or received.

It should be noted that the host device 200 may include further connections. For example, the host device 200 may be communicatively coupled to a communications network. If the host device 200 is part of a POS system, the host device 200 may transmit data relating to a sale in which the scanner 100 has decoded at least one object (e.g., barcode) for the sale. In this manner, a database may be maintained at a network component relating to all transactions performed by the POS system.

As discussed above, the scanner 100 is required to be configured to properly couple to the host device. As is common in a retail environment utilizing the POS system, a peripheral device such as a scanner is interchangeably used with any host device. For example, the scanner may be added, removed, re-installed, upgraded, temporarily removed for maintenance, etc. The installation of the scanner 100 to the host device 200 may relate to the coupling. The installation typically requires a hardware connection (e.g., established using the s-connector 120 and the h-connector 215) and/or a software connection (e.g., using a common protocol of the host device 200 with the scanner 100).

According to the exemplary embodiments of the present invention, the scanner 100 may scan an object that includes configuration data encoded for the software connection portion of the installation. Specifically, the scanner 100 may scan a barcode with the configuration data that enables coupling of the scanner 100 to the host device 200. As discussed above, the scanner 100 may be coupled to the host device 200 using a hard-wired technology (e.g., a cable) or a wireless technology (e.g., Bluetooth). In one of the exemplary embodiments of the present invention, the barcode may be encoded in such a way that when the barcode is scanned by the scanner 100, the decoded data decrypted from the encoded data indicates that the data contained therein is for configuration purposes (e.g., encoded in a header of the barcode). In another exemplary embodiment of the present invention, the scanner 100 may be preset for configuration. Thus, a barcode that is scanned is assumed to be for configuration purposes.

In the case of a hard-wired connection, the scanner 100 may be required to be configured to enable hardware handshaking (e.g., between the s-connector 120 and the h-connector 215). Furthermore, the scanner 100 may be required to be configured to enable a software flow control. The scanning of the barcode may include the configuration data to accomplish these aspects of the coupling. It should be noted that there may be multiple barcodes that are scanned to receive all of the necessary configuration data.

In the case of a wireless connection, the scanner 100 may be required to be configured to enable connection to a particular host MAC address of the host device 200 as well as provide encryption or PIN information to complete the connection. The scanning of the barcode may include the configuration data to accomplish these aspects of the coupling. It should be noted that there may be multiple barcodes that are scanned to receive all of the necessary configuration data.

The exemplary embodiments of the present invention include the host device 200 with the display 205 to show a barcode 220 that includes configuration data. The display 205 may be configured so that the scanner 100 is enabled to properly scan the barcode 220 that is displayed. In the exemplary embodiment where multiple barcodes are used for the configuration, the display 205 may present the multiple barcodes in succession. For example, a first barcode may be shown until an indication is entered to the host device 200 (via the input device 210) that the first barcode was properly scanned, thereby presenting a second barcode to be scanned. In another example, a first barcode may be shown for a first predetermined amount of time to enable the scanner 100 to properly capture the scan. A second barcode may be shown for a second predetermined amount of time upon the first predetermined amount of time lapsing. It should be noted that the predetermined amount of time may be constant for each barcode.

By presenting the barcode 220 on the display 205 of the host device 200, the scanner 100 may be coupled to the host device 200 without a need for barcodes disposed on a periphery of the host device 200, a need for a manual (i.e., remote location) including barcodes for configuration, etc. Furthermore, because the barcode 220 is electronically shown on the display 205, the barcode 220 is unlikely to be damaged in such a way as to prevent a proper scan from being performed. In addition, the barcode 220 may be uniquely created for the host device 200 without incurring additional costs associated with creating the unique barcode conventionally associated when a physical barcode is used. The unique barcodes may be also be created for specific scanners. For example, when the scanner 100 is a laser based scanner, a first barcode may be used for configuration purposes with a particular host device. In another example, when the scanner 100 is an imager based scanner, a second barcode may be used for configuration purposes with a particular host device.

It should be noted that the display 205 may include properties to enable a scan to be performed thereon when the barcode 220 is shown. For example, when the display 205 is an LCD, crystals disposed therein may be altered during the scanning procedure so that a glare is not created. As discussed above, with laser based scanners, a laser is emitted from the scanning engine 115 and receives a reflection to determine intensities. A glare may alter the intensities, thereby preventing a proper scan to be performed.

Figure 3:
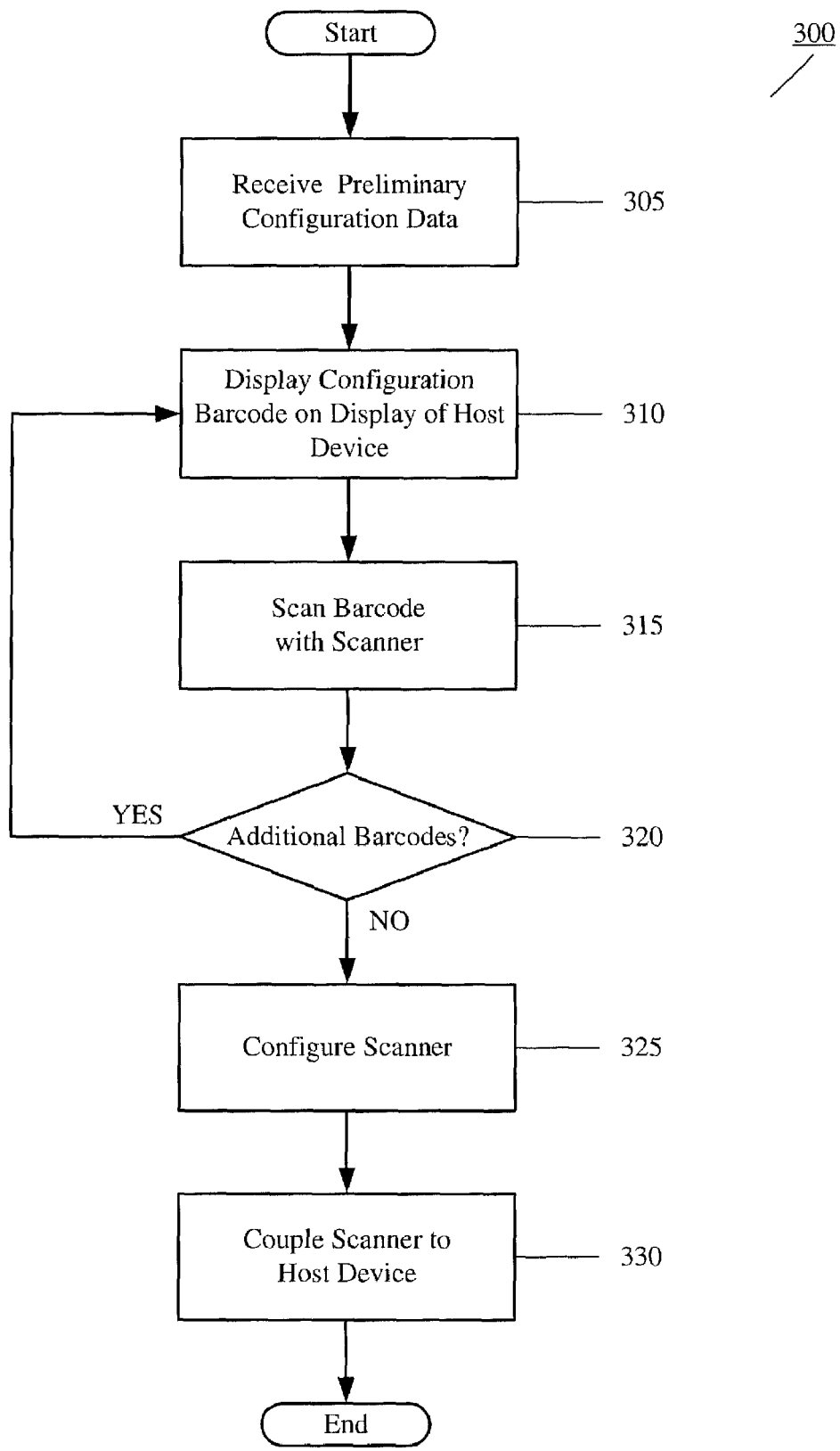
FIG. 3 shows a method for configuring a scanner to couple to a host device according to an exemplary embodiment of the present invention.

FIG. 3 shows a method 300 for configuring a scanner to couple to a host device according to an exemplary embodiment of the present invention. As discussed above, the method 300 may apply to configuring any computing device that is capable of performing a scan to a host device. The method 300 will be discussed with reference to the scanner 100 of FIG. 1 and the host device 200 of FIG. 2.

In step 305, preliminary configuration data is received. For example, the input device 210 may be used to enter the preliminary configuration data. The host device 200 may receive the preliminary configuration data in preparation for configuring the scanner 100 to couple thereto. The preliminary configuration data may include a variety of different parameters necessary for a proper configuration of the scanner 100 such as a type of the scanner 100, a model number of the scanner 100, a user associated with the scanner 100, etc.

In step 310, the configuration barcode 220 is shown on the display 205 of the host device 200. The barcode 220 may be based on the preliminary configuration data received in step 305. In a first example, the barcode 220 may be retrieved from a database that indicates that the barcode 220 is to be used for configuring the scanner 100. The database may be stored in a memory of the host device 200, a network storage component in which the host device 200 is associated, etc. As discussed above, when the configuration barcode 220 is shown on the display 205, the display 205 may be configured to enable a scan to be performed thereon. Thus, the display 205 may alter display properties.

It should be noted that the displaying of the configuration barcode 220 on the display 205 is only exemplary. In other exemplary embodiments of the present invention, the configuration barcode 220 may be outputted onto another medium such as being printed on paper. The outputted barcode may subsequently be scanned for the configuring of the scanner 100.

In step 315, the barcode 220 is scanned with the scanner 100. The barcode 220 may be decoded by the scanner 100 to generate the decoded data that includes configuration parameters to configure the scanner 100. As discussed above, the scanner 100 may determine that the barcode 220 is used for configuration purposes (e.g., indication included in a header of the barcode 220, preset the scanner 100 to a configuration mode, etc.). The decoded data may be stored in the memory 110 until required.

In step 320, a determination is made whether there are additional barcodes to be scanned to configure the scanner 100. As discussed above, there may be at least one barcode used to configure the scanner 100. Thus, when additional barcodes exist, the scanner 100 will be required to scan these barcodes as well to properly configure the scanner 100. When additional barcodes exist, the method 300 returns to step 310 where one of the additional configuration barcodes is shown on the display 205. Subsequently, the additional configuration barcode is scanned to generate the decoded data corresponding to the configuration parameters. The method 300 enables all of the configuration barcodes to be shown and scanned (steps 310, 315).

In step 325, the scanner 100 is configured. The decoded data stored in the memory 110 may be retrieved so that the scanner 100 may be properly configured. The processor 105 may perform the configuration. For example, the decoded data may include drivers that configure a data transmission protocol used by the scanner 100 when transmitting data to the host device 200. The processor 105 may automatically perform the configuration. Thus, in step 330, the scanner 100 may be properly coupled to the host device 200. Subsequently, data scanned by the scanner 100 may be transmitted to the host device 200 (e.g., barcodes on items for a POS system).

It should be noted that the method 300 may include additional steps. For example, as discussed above, the additional barcodes may be shown in several different manners. When the additional barcodes are shown when the user is prepared to perform a further scan, the method 300 may include a step after step 320 to enter an indication of readiness. When the additional barcodes are shown after a predetermined time period, the method 300 may include a step after step 320 to wait the predetermined time period. In another example, the scanner 100 may be manually configured. Thus, a user of the scanner 100 may optionally select certain parameters that may not be absolutely required for the proper configuration to couple to the host device 200.

The exemplary embodiments of the present invention enable a scanner to be properly configured to couple to a host device. The scanner may scan a unique barcode associated with coupling that scanner to a particular host device. The barcode may be shown on a display of the host device. The digital display of the barcode prevents issues related with physical barcodes (e.g., wearing) that may be, for example, disposed on a periphery of the host device itself. The generation of the unique barcode (i.e., labeling process) may also be easily maintained as the barcode is not required to be uniquely printed to match with a specific host device.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:

receiving preliminary data necessary for configuration of a peripheral device;

generating an object, as a function of the preliminary data, using an output arrangement of a host device, the object including configuration data which enables coupling of the peripheral device to the host device, wherein the object is unique to the peripheral device;

scanning the object using a scanner of the peripheral device to obtain the configuration data;

configuring the peripheral device as a function of the configuration data; and coupling the peripheral device to the host device in response to configuring the peripheral device.

2. The method of claim 1, wherein the coupling is of one a hard-wired connection and a wireless connection.

3. The method of claim 2, wherein, when the coupling is a hard-wired connection, the configuration data includes parameters related to at least one of hardware handshaking and software flow control.

4. The method of claim 2, wherein, when the coupling is a wireless connection, the configuration data includes parameters related to an address of the host device and encryption information.

5. The method of claim 1, wherein the object is one of a one-dimensional barcode, a two-dimensional barcode, a color barcode, an image, and an optical character recognition string.

6. The method of claim 1, further comprising:

prior to the coupling, generating at least one further object, as a function of the preliminary data, using the output arrangement of the host device which includes further configuration data which enables coupling of the peripheral device to the host device, wherein the one further object is unique to the peripheral device;

scanning the at least one further object with the scanner of the peripheral device; and configuring the peripheral data as a further function of the configuration data.

7. The method of claim 6, wherein the at least one further object is generated after the object one of upon an indication of readiness being received and upon a predetermined time interval lapsing.

8. A system, comprising:

a host device including an output arrangement, the host device receiving preliminary data necessary for generating configuration data and generating an object comprising the configuration data; and a peripheral device including a scanner, the scanner scanning the object to obtain the configuration data which enables coupling of the peripheral device to the host device, wherein the object is unique to the peripheral device, the peripheral device being configured as a function of the configuration data to couple to the host device.

9. The system of claim 8, wherein the peripheral device couples to the host device using one of a hard-wired connection and a wireless connection.

10. The system of claim 9, wherein, with a hard-wired connection, the configuration data includes parameters related to at least one of hardware handshaking and software flow control.

11. The system of claim 9, wherein, with a wireless connection, the configuration data includes parameters related to an address of the host device and encryption information.

12. The system of claim 8, wherein the object is one of a one-dimensional barcode, a two-dimensional barcode, a color barcode, an image, and an optical character recognition string.

13. The system of claim 8, wherein the peripheral device further scans at least one further object generated by the host device, the at least one further object including further configuration data.

* * * * *

UNITED STATES PATENT AND TRADEMARK OFFICE
CERTIFICATE OF CORRECTION

PATENT NO. : 8,302,848 B2
APPLICATION NO. : 12/126750
DATED : November 6, 2012
INVENTOR(S) : Koch et al.

It is certified that error appears in the above-identified patent and that said Letters Patent is hereby corrected as shown below:

In the Specifications:

In Column 1, Line 52, delete "DESCRIPTION" and insert -- BRIEF DESCRIPTION --, therefor.

In Column 2, Line 65, delete "215" and insert -- 115 --, therefor.

Signed and Sealed this
Twenty-third Day of April, 2013

Teresa Stanek Rea
*Acting Director of the United States Patent and Trademark Office*